US006141838A

United States Patent [19]

Cooper

[11] Patent Number: 6,141,838

[45] Date of Patent: Nov. 7, 2000

[54] COSMETIC ACCESSORY CLIP WITH MAKE-UP COMPACT CASE

[76] Inventor: Gary Cooper, 104 W. 70th St., Apt. 3D, New York, N.Y. 10023

[21] Appl. No.: 09/305,600

[22] Filed: May 5, 1999

Related U.S. Application Data

[63] Continuation-in-part of application No. 08/972,981, filed as application No. PCT/US98/03226, Feb. 18, 1998, Pat. No. 5,836,055.

[60] Provisional application No. 60/039,021, Feb. 21, 1997.

[51] Int. Cl.[7] ............................ A44B 21/00; F16L 33/02

[52] U.S. Cl. ................................ 24/339; 24/329; 24/346

[58] Field of Search ............................ 24/339, 329, 346, 24/330, 67.3

[56] References Cited

U.S. PATENT DOCUMENTS

| | | | |
|---|---|---|---|
| 803,464 | 10/1905 | Beck | 24/339 |
| 1,462,714 | 7/1923 | Marchand | 24/339 |
| 1,644,948 | 10/1927 | Poirier | 24/339 |
| 2,942,314 | 6/1960 | Debner et al. | 24/339 |
| 3,153,267 | 10/1964 | Rowland, Jr. | 24/339 |
| 3,636,595 | 1/1972 | Wines | 24/339 |
| 3,778,537 | 12/1973 | Miller | 24/339 |
| 3,860,015 | 1/1975 | Tarro . | |
| 3,969,836 | 7/1976 | DuBois | 24/163 K |
| 3,983,602 | 10/1976 | Barry | 24/339 |
| 4,050,187 | 9/1977 | Geiger et al. | 24/339 |
| 4,934,644 | 6/1990 | Nagy et al. | 24/339 |
| 5,642,557 | 7/1997 | Clews | 24/339 |
| 5,988,575 | 11/1999 | Lesko | 24/339 |

FOREIGN PATENT DOCUMENTS

| | | | |
|---|---|---|---|
| 0271797 | 6/1969 | Australia | 24/339 |
| 0960711 | 2/1937 | Germany | 24/339 |
| 0461277 | 2/1937 | United Kingdom | 24/339 |

*Primary Examiner*—Victor N. Sakran
*Attorney, Agent, or Firm*—Alfred M. Walker

[57] ABSTRACT

A cosmetic accessory clasp includes two or more clips for holding longitudinally extending articles. For example, the clasp accommodates both a lipstick barrel and a lip liner pencil. The clasp includes two or more open clips, such as an open clip having attached at the closed portion thereof a smaller clip adjacent to the larger clip. The larger lipstick barrel is inserted by the spring action of the larger clip and the lip liner pencil is insertable in the smaller clip adjacent to the larger clip. The clasp may hold other related longitudinally extending articles, such as eyebrow pencils and the like.

12 Claims, 15 Drawing Sheets

COSMETIC ACCESSORY CLIP WITH MAKE-UP COMPACT CASE

This application claims benefit of Provisional Application 60/039,021 filed Feb. 21, 1997 which is a continuation-in-part of application Ser. No. 08/972,981, filed Nov. 19, 1997, now U.S. Pat. No. 5,836,055 which is a 371 of PCT/US98/03226 filed Feb. 18, 1998.

FIELD OF THE INVENTION

This invention relates to an apparatus for clasping together two or more longitudinally extending articles, such as a lipstick barrel with a lip liner pencil, in combination with a mirrored cosmetic make-up compact case.

BACKGROUND OF THE INVENTION

Especially for a person with a large carry bag, such as a handbag or backpack, it is difficult to find and keep together two or more related longitudinally extending articles. For example, in order to use lipstick, it is important to outline the lips with the lip liner pencil prior to applying the lipstick thereon. However, there has not been a device to hold both items together in proximity so that the user can have easy access to both items simultaneously, without having to search through many items within the carry bag.

SUMMARY OF THE INVENTION

Therefore, in keeping with these objects and others which may be come apparent, the present invention relates to a clip type clasp for holding two or more longitudinally extending articles, such as both a lipstick barrel and a lip liner pencil, with an auxiliary cosmetic make-up compact case attached thereto. For example, any two or more related articles can be held, depending upon the configuration of the clip type clasp. For example, in certain embodiments, the clasp may hold a lipstick barrel, a lip liner pencil and an eyebrow pencil, or other related personal items.

The cosmetic make-up compact case is attached to an exterior surface of the clip, and includes a hollow compartment for make-up substances. It is covered by a hinged or sliding cover.

The clip type clasp includes an open clip, having attached at one or more closed portions thereof, one or more other clips adjacent to same, wherein each clip holds a longitudinally extending article related to the other one or more articles. For example, there may be two, three or more clips in one integral clasp.

In a preferred embodiment, the clasp includes an open large clip having attached at the closed portion thereof a smaller clip adjacent to same, wherein a longitudinally extending article, such as a lipstick barrel, is inserted by the spring action of a large clip and another related longitudinally extending article, such as a lip liner pencil, is insertable in a smaller clip adjacent to the larger clip.

According to another preferred embodiment of the invention, there is provided a unitary clip for clipping together an elongate lipstick barrel and an elongate lip liner pencil, which clip includes a first channel-shaped clip member having a first concave open internal wall, in which no parts of the first internal wall are contiguous, such that free edges of the channel forming the wall are spaced from one another, the first internal wall being shaped and dimensioned to resiliently grip the barrel; and, integral with the first member, a second channel-shaped clip member which has a smaller bore than the first member and extends substantially parallel to the first member, such that respective channels of the first and second members are coterminous, the second member having a second concave open internal wall shaped and dimensioned to resiliently grip the pencil, in which no parts of the second internal wall are contiguous, such that free edges of the channel forming the wall are spaced from one another, the first and second members being separated from one another by a common elongate partition wall having a first face forming part of the first internal wall and a second face forming part of the second internal wall.

While a clasp with two clips adjacent to each other is preferable, it is contemplated that other embodiments of the clip may have three or more clips.

Optionally, each clip may have internal friction inducing members, such as small nibs, longitudinally extending ribs or ridges therein, to better retain the lipstick barrel or the lip liner pencil in their respective concave clips. Furthermore, a mirror may be inlaid in a frame adjacent to one of the arcuate exterior surfaces of the device.

DESCRIPTION OF THE EMBODIMENTS

In one embodiment an "S" shaped embodiment is proposed wherein an arcuate portion of a circle is adjacent to an oppositely extending smaller arcuate portion, so that the two items together form an "S" with a larger bottom portion than the top portion.

Another embodiment includes a "U" shaped clip having a common edge for the wing portions extending in opposite directions of the smaller clip portion, which may take any configuration.

Another version includes a "U" shaped clip wherein the smaller clip extends in an opposite direction but is attached at a tangential edge of one of the wing portions of the larger clip.

The present invention further comprises a method of clipping together an elongate lipstick barrel and an elongate lip liner pencil which includes the steps of providing a clip according to the invention and inserting the barrel and the pencil respectively in said first and second members to be resiliently gripped thereby.

It is contemplated that other embodiments fall within the scope of the invention, wherein a clasp has two or more clip portions integrally connected, for holding two or more related longitudinally extending articles, such as lipstick barrels, lip liner pencils, eyebrow pencils and the like.

DETAILED DESCRIPTION OF THE EMBODIMENTS

Figure 1:
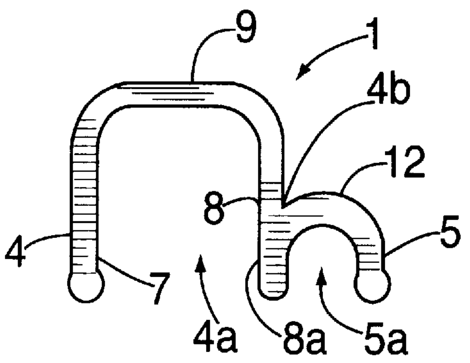
FIG. 1 is a left side elevational view of the embodiment for a cosmetic accessory clasp, the right side view being a mirror image thereof.
Figure 2:
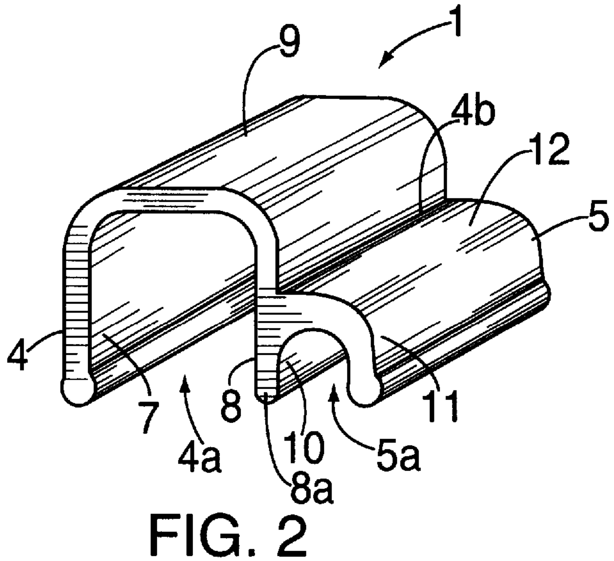
FIG. 2 is a perspective view thereof.
Figure 3:
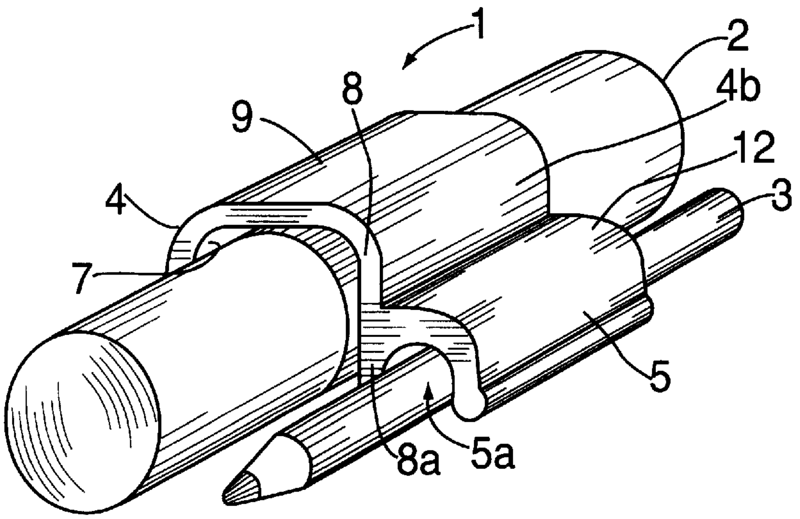
FIG. 3 is a perspective view thereof, shown with a lipstick barrel and a lip liner pencil held therein.

As shown in FIGS. 1–3, the present invention describes a clip type clasp for clasping together two or more axially extending cosmetic accessories, such as a lipstick barrel 2 and a lip liner pencil 3.

Clasp 1 holds a pair of cosmetic accessories, such as lipstick barrel 2 and lip liner pencil 3 together in proximity so that a user can have easy access to both items simultaneously.

Generally lipstick barrel 2 has a cross-sectional diameter of about 1.8 cm (0.70 inches) and lip liner pencil 3 has a cross-sectional diameter of about 0.8 cm (0.30 inches). Other lipstick barrels have a diameter of about 1.1 cm (0.40 inches).

Clasp 1 includes a large open clip 4 having attached tangentially at the shoulder portion **4*b* thereof a smaller clip 5 adjacent to same, wherein the larger lipstick barrel is inserted and held in place by the spring action of the resilient wings 7, 8 joined together by base 9 of the larger clip 4 and the lip liner pencil 3 is insertable in and held in place by the spring action of the resilient wings 10, 11 joined together by base 12 of the smaller clip 5 adjacent to the larger clip 4. In the embodiment shown in FIGS. 1–3, one wing 10 of smaller clip 5 is integral with a distal portion 8*a* of wing 8 of larger clip 4**.

Figure 4:
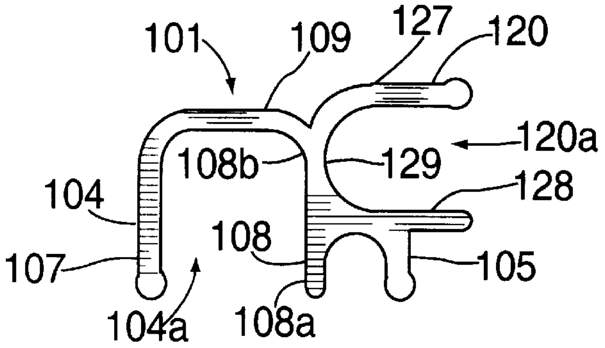
FIG. 4 is a left side elevational view of a second embodiment for a cosmetic accessory clasp, the right side view being a mirror image thereof.
Figure 5:
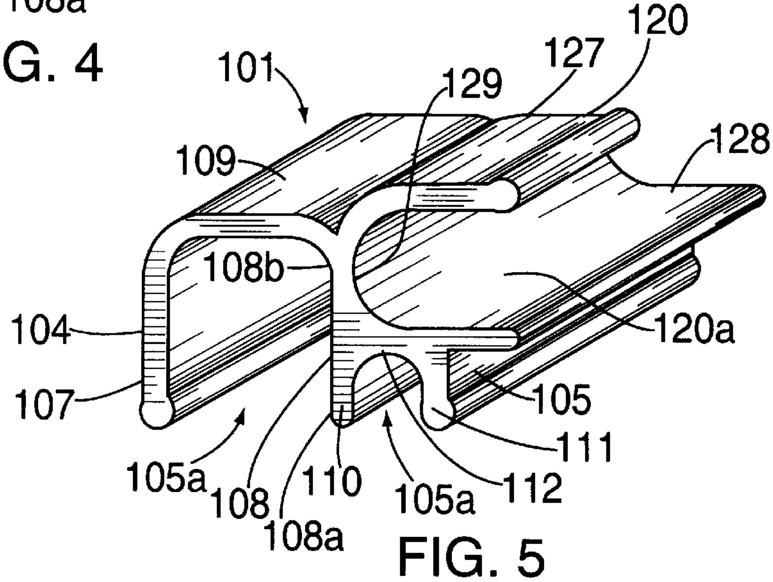
FIG. 5 is a perspective view thereof.

In the version of FIGS. 1–3, large clip 4 is a "U" shaped clip wherein the open end **5*a* of smaller clip 5 extends in the same direction as open end 4*a* of larger clip 4, but is attached tangentially at shoulder portion 46 of wing portion 8 of the larger clip 4. In the embodiment shown in FIGS. 1–3, larger clip 4 has opening 4*a* with a width of about 1.8 cm (0.70 inches) to accommodate a lipstick barrel 2 having a diameter of about 1.8 cm (0.70 inches). Smaller clip 5 has opening 5*a* with a width of about 0.8 cm (0.30 inches) to hold a lip liner pencil 3 having a cross-sectional diameter of 0.30 inches. FIGS. 4–5 show an alternate embodiment for a cosmetic accessory clasp 101 wherein a third mid-size clip 120 is attached to both larger clip 104 and smaller clip 105. In this embodiment, clip 120 may be used to hold a third cosmetic accessory, such as a lipstick barrel (not shown) having a smaller diameter of about 1.1 cm (0.40 inches). Therefore mid-size clip 120 includes opening 120*a* having a width of about 1.1 cm (0.40 inches). Mid-size clip 120 also includes wings 127, 128 joined together by base 129 of mid-size clip 120. Base 129 of mid-size clip 120 is integral with a proximal end 108*b* of wing 108 of larger clip 104, which also includes opposite wing 107 joined by wing 108 by common base 109**.

Smaller clip 105 of clasp 101 includes open end **105*a* and wings 110, 111 joined by base 112, which base 112 is integral with lower wing 128 of mid-size clip 120. It is noted that wing 110 of smaller clip 105 is integral with the distal end 108*a* of wing 108 of larger clip 104. Moreover, open end 120*a* extends in a perpendicular direction away from the parallel direction of open ends 104*a*, 105*a* of larger clip 104 and smaller clip 105 of clasp 101**.

Figure 6:
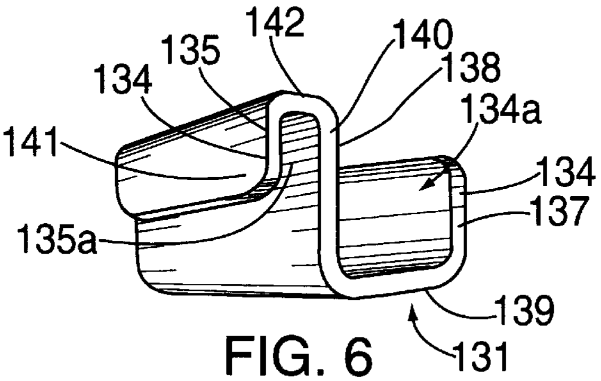
FIG. 6 is a perspective view of a third embodiment for a cosmetic accessory clasp for a small lip liner barrel.

It is further noted that the size of a larger clip can be varied to accommodate the various sizes of lipstick barrels. For example, FIG. 6 shows larger clip 134 of clasp 131 having an opening **134*a* with a width of about 1.1 cm (0.40 inches) to accommodate thinner lipstick barrels (not shown) have corresponding cross-sectional diameters of about 1.1 cm (0.40 inches). Smaller clip 135 bears an opening 135*a*** of about 0.8 cm (0.30 inches).

Figure 7:
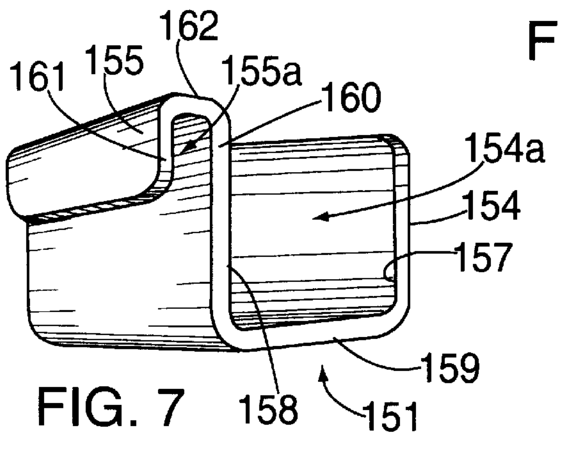
FIG. 7 is a perspective view of a fourth embodiment for a cosmetic accessory clasp for a large lipstick barrel.

On the other hand, FIG. 7 shows larger clip 154 of clasp 151 having an opening **154*a*** of about 1.8 cm (0.70 inches) to accommodate larger lipstick barrels having a cross-sectional diameter of about 1.8 cm (0.70 inches).

It is noted that while respective openings **134*a* and 154*a* of larger clips 134, 154 of clasps 131, 151 vary in width, in FIGS. 6 and 7, clasps 131, 151 bear similar structural configurations. For example respective open ends 135*a*, 155*a* of smaller clips 135, 155 extend in a direction 180° opposite to the direction of openings 134*a*, 154*a* of respective larger clips 134, 154. Furthermore, wings 140, 160 of respective smaller clips 135, 155 are integral with respective wings 138, 158 of larger clips 134, 154**.

Also in FIG. 6 wings 140, 141 of smaller clip 135 are joined by base 142 and wings 137, 138 of larger clip 134 are joined by base 139, which extends parallel to base 142 of smaller clip 135.

Furthermore, in FIG. 7, wings 160, 161 of smaller clip 155 of clasp 151 are joined by base 162 and wings 157, 158 of larger clip 154 are joined in base 159, which extends parallel to base 162 of smaller clip 155.

Another embodiment includes a "U" shaped clip having a common edge for the wing portions extending in opposite directions of the smaller clip portion, which may take any configuration.

Figure 8:
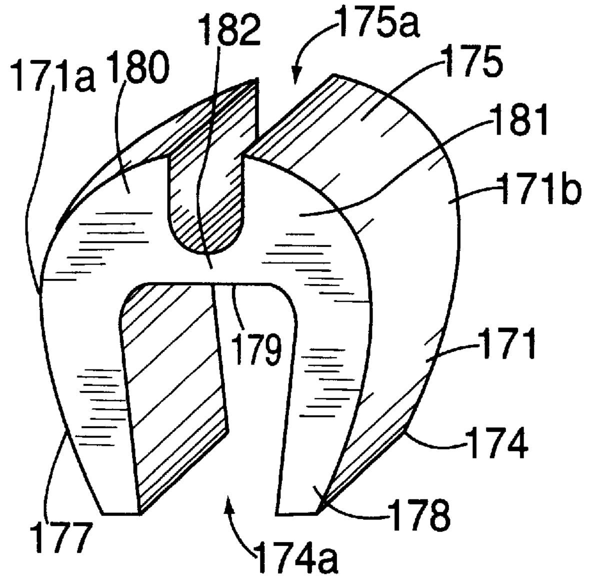
FIG. 8 is a perspective view of a fifth embodiment for a cosmetic accessory clasp.
Figure 10:
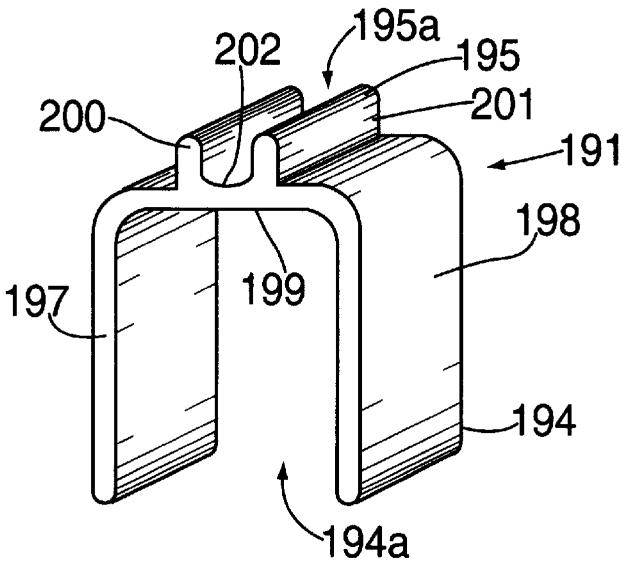
FIG. 10 is a perspective view of a seventh embodiment for a cosmetic accessory clasp.

FIGS. 8 and 10 show clasps 171, 191 which bear similar modified H-shaped structural configurations. For example respective larger clips 174, 194 have openings 174*a*, 194*a* which extend 180° opposite to openings 175*a*, 195*a* of smaller clips 175, 195. Larger clips 174, 194 include respective pairs of wings 177, 178 and 197, 198 joined by respective bases 179, 199. Likewise, smaller clips 175, 195 include respective pairs of wings 180, 181 and 200, 201 joined by respective bases 182, 202. Furthermore, in clasp 171 base 179 of larger clip 174 is integral with and extends parallel to base 182 of smaller clip 175. In clasp 191, base 199 of larger clip 194 is integral with and extends parallel to base 202 of smaller clip 195.

However, clasp 171 of FIG. 8 differs from clasp 191 of FIG. 10 in that continuous arcuate side edges 171*a*, 171*b* make wings 180, 181 of smaller clip 175 integral with wings 177, 178 of larger clip 174. Arcuate edges 171*a*, 171*b* extend from the distal open end 175*a* between wings 180, 181 of smaller clip 175 to the opposite, distal open end 174*a* between wings 177, 178 of larger clip 174.

Figure 9:
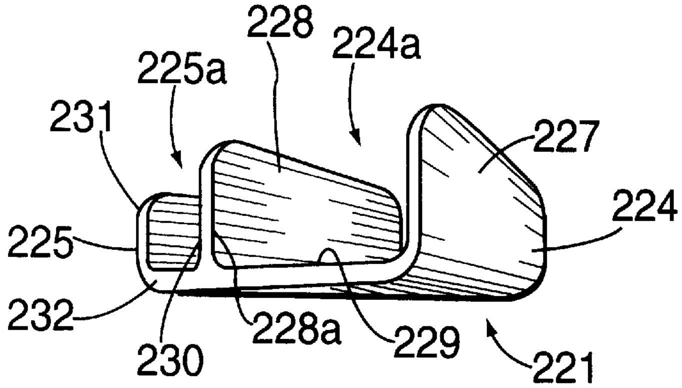
FIG. 9 is a perspective view of a sixth embodiment for a cosmetic accessory clasp.

FIG. 9 shows an alternate E-shaped embodiment 221 wherein respective larger clip 224 is integral with and has opening 224*a* extending parallel to opening 225*a* of smaller clip 225. In this embodiment larger clip 224 includes wings 227, 228, and smaller clip 225 includes wings 230, 231, wherein wing 230 of smaller clip 225 is integral with proximal portion 228*a* of wing 228 of larger clip 224. Furthermore, base 229 of larger clip 224 is co-terminus with base 232 of smaller clip 225.

Figure 11:
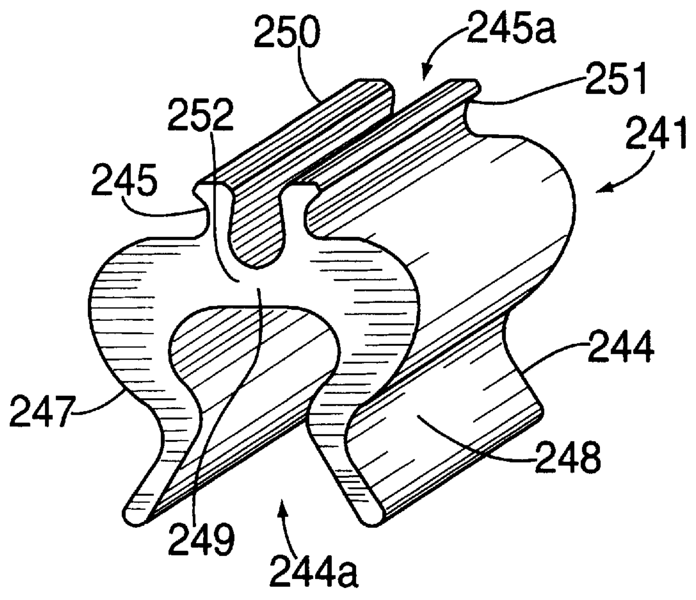
FIG. 11 is a perspective view of an eighth embodiment for a spring loaded cosmetic accessory clasp, wherein the clasp is adjustable for both large and small lip liner barrels.
Figure 12A:
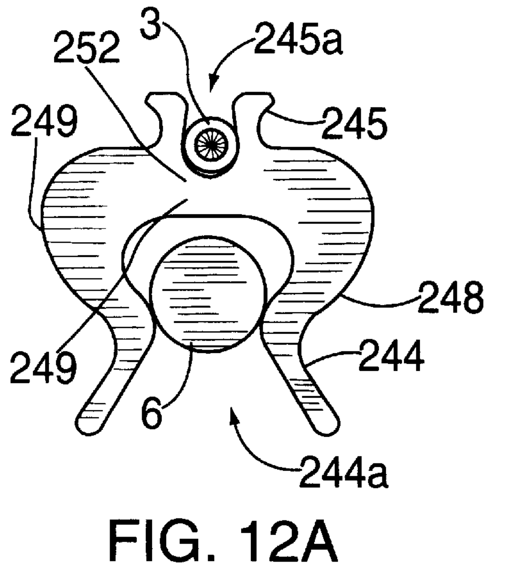
FIG. 12A is a left side elevational view of the clasp as in FIG. 11, shown with a small lip liner barrel therein.
Figure 12B:
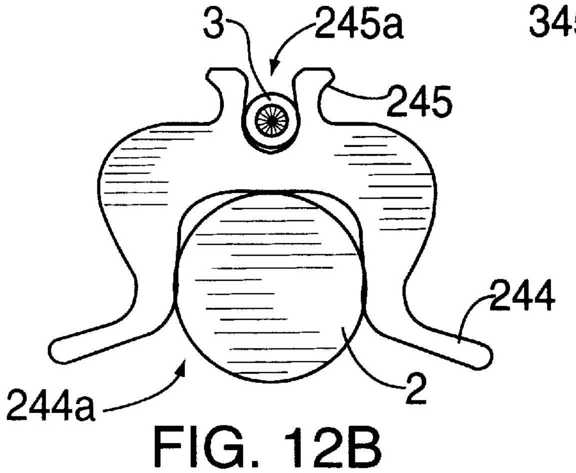
FIG. 12B is a left side elevational view of the clasp as in FIG. 1, shown with a large lipstick barrel therein.

As shown in FIGS. 11, 12A and 12B, the eighth embodiment for a clasp 241 is adjustable to hold both large lipstick barrels 2 having a cross-sectional diameter of about 1.8 cm (0.70 inches), as well as mid-size lipstick barrels 6 having a smaller cross-sectional diameter of about 1.1 cm (0.40 inches).

Like clasps 171, 191, clasp 241 bears a modified H-shaped configuration, wherein smaller clip 245 is U-shaped, and includes an opening 245*a* which extends in a direction 180° opposite to opening 244*a* of larger U-shaped clip 244. Clasp 241 bears a modified H-shaped configuration because base 252 of smaller clip 245 is integral with, and extends parallel to, base 249 of larger clip 244.

Base 252 of smaller clip supports upwardly extending wings 250, 251, which also extend generally 180° opposite downwardly extending wings 247, 248 of larger clip 244.

Unlike the embodiments shown in FIGS. 1–10, larger clip 244 of clasp 241 of FIGS. 11, 12A and 12B is more resilient and malleable, so that larger clasp 244 can accommodate either a smaller diameter lipstick barrel 6 of about 1.1 cm (0.40 inches) in diameter, as in FIG. 12A or a larger diameter lipstick barrel 2 of about 1.8 cm (0.70 inches), as in FIG. 12.

Furthermore, while adjustable clip 241 can have any modified configuration, in FIGS. 11, 12A and 12B clasp 241 bears a cross-sectional shape similar to a musical string lute.

Figure 13:
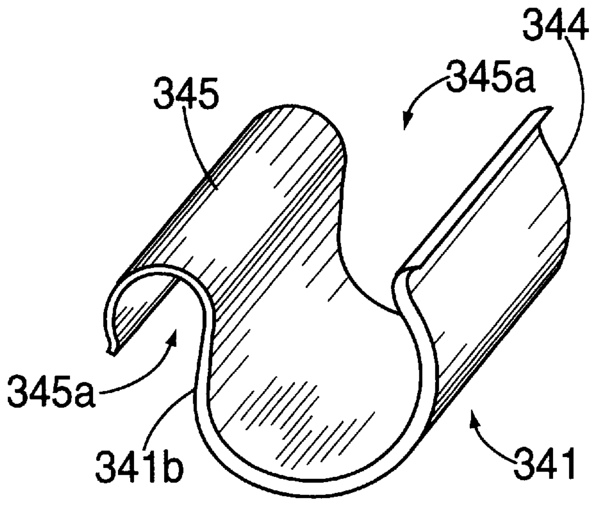
FIG. 13 is a perspective view of a ninth S-shaped embodiment for a cosmetic accessory clasp.

In addition, in the embodiment shown in FIG. 13, clasp 341 is generally "S-shaped", wherein in this embodiment an "S" shaped embodiment is proposed wherein an arcuate portion of a circle is adjacent to a oppositely extending smaller arcuate portion, so that the two items together form an "S" with a larger bottom portion than the top portion. Smaller arcuate-shaped clip 345 is interconnected to larger arcuate-shaped clip 344 in such a manner that the sense of curvature of arc-shaped clip 345 is opposite to that of its adjacent arc-shaped clip 344 wherein the interconnection is smoothly accomplished, resulting in a serpentine-shaped clasp 341.

Furthermore, smaller clip 345 is joined tangentially to larger clip 344 at a point 341*b* where the sense of curvature of arcuate smaller clip 345 changes to the opposite sense of curvature of arcuate larger clip 344.

As a result, open end 345*a* of smaller clip 345 extends in a direction 180° opposite to the direction of open end 344*a* of larger clip 344. Furthermore, the inner radius of the major loop of larger clip 344 is about 0.93 cm (0.365 inches), to provide an opening of 1.85 cm (0.73 inches) to accommodate a larger lipstick barrel of about 1.8 cm (0.70 inches). The inner radius of the minor loop of smaller clip 345 is about 0.38 cm (0.15 inches), to accommodate a lip liner pencil of about 0.76 cm (0.30 inches) in diameter.

Also, to provide stability the depth of each clip 1, 101, 131, 151, 171, 191, 221, 241 or 341 is at least 1.14 cm (0.45 inches), to snugly hold lipstick barrels and place axially extending cosmetic accessories therein.

Moreover, in the embodiment shown in FIGS. 14, 14A, 14B, 14C and 14D clasp 441 is generally "S-shaped", wherein in this embodiment an "S" shaped embodiment is disclosed wherein an arcuate portion of a circle is adjacent to a oppositely extending smaller arcuate portion, so that the two items together form an "S" with a larger bottom portion than the top portion. Smaller arcuate-shaped clip 445 is interconnected to larger arcuate-shaped clip 444 in such a manner that the sense of curvature of smaller arc-shaped clip 445 is opposite to that of its adjacent larger arc-shaped clip 444, wherein the interconnection is smoothly accomplished, resulting in a serpentine-shaped clasp 441.

Furthermore, smaller clip 445 is joined tangentially to larger clip 444 at a point 441*b* where the sense of curvature of arcuate smaller clip 445 changes to the opposite sense of curvature of arcuate larger clip 444.

As a result, open end 445*a* of smaller clip 445 extends in a direction 180° opposite to the direction of open end 444*a* of larger clip 444. Furthermore, the inner radius of the major loop of larger clip 444 is about 0.93 cm (0.373 inches), to provide an opening of 1.9 cm (0.746 inches) to accommodate a larger lipstick barrel of about 1.8 cm (0.70 inches), The inner radius of the minor loop of smaller clip 445 is about 0.39 cm (0.155 inches), to provide an opening of about 0.8 cm (0.031 inches) to accommodate a lipstick pencil of about 0.76 cm (0.30 inches) in diameter.

Also, to provide stability, while depth may vary, the optimal depth of each larger clip 444, which depth corresponds to the axial orientation of a lipstick barrel placed therein, is about 3.8 cm (1.50 inches), to snugly hold lipstick barrels and place axially extending cosmetic accessories therein.

To ease in guiding a lip liner pencil within smaller clip 445, an overhanging cantilevered portion 446 extends beyond the opening of smaller clip 445. While smaller clip 445 has an inner radius of about 0.38 cm (0.15 inches), the curvature of cantilevered portion 446 is less acute, and has a larger radius of about 0.45 cm (0.18 inches), to permit the lip liner pencil to guide through the opening under cantilevered portion 446 and into smaller clip 445.

To further enhance the retention of the lipstick barrel within larger clip 444 and the lip liner pencil within smaller clip 445, retention members 447 are located within respective clips 444 and 445. As shown in FIGS. 14A, 14B and 14C, preferably retention members are longitudinally extending ribs or ridges, which extend parallel to the axis position of the respective lipstick barrel or lip liner pencil within respective clips 444 and 445.

Figure 14:
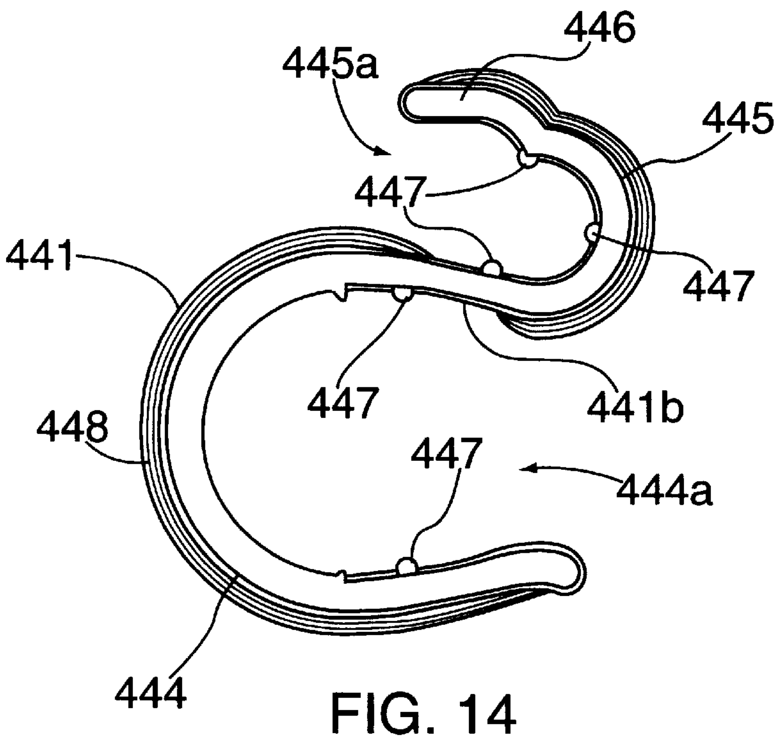
FIG. 14 is a top plan view of a tenth S-shaped embodiment for a cosmetic accessory clasp.
Figure 14A:
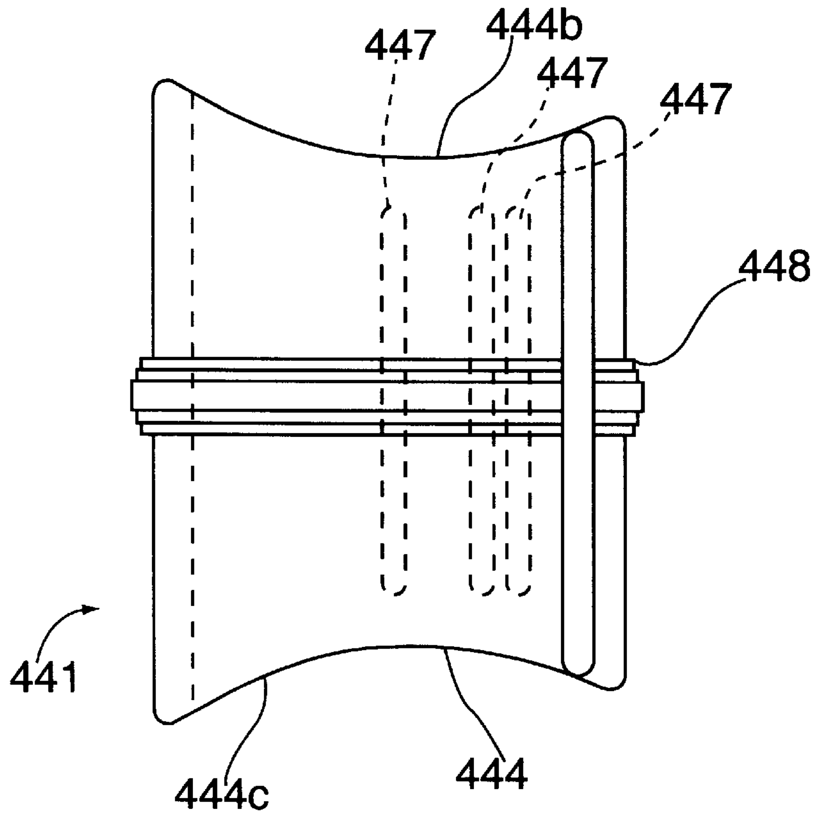
FIG. 14A is a front elevational view thereof.
Figure 14B:
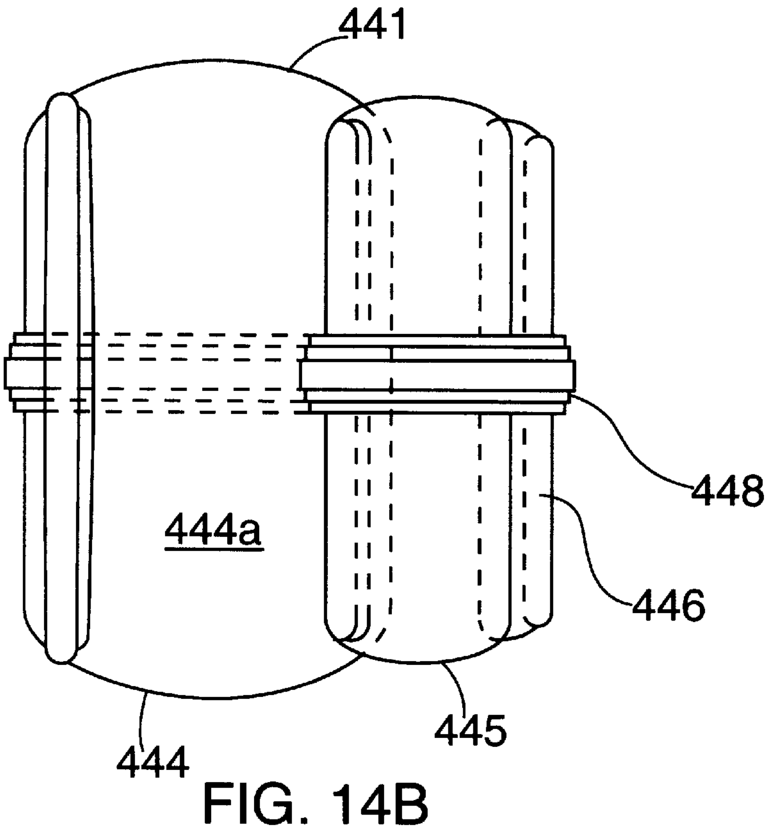
FIG. 14B is a right side elevational view thereof, with the hidden barrel engaging ridges shown in dotted lines.
Figure 14C:
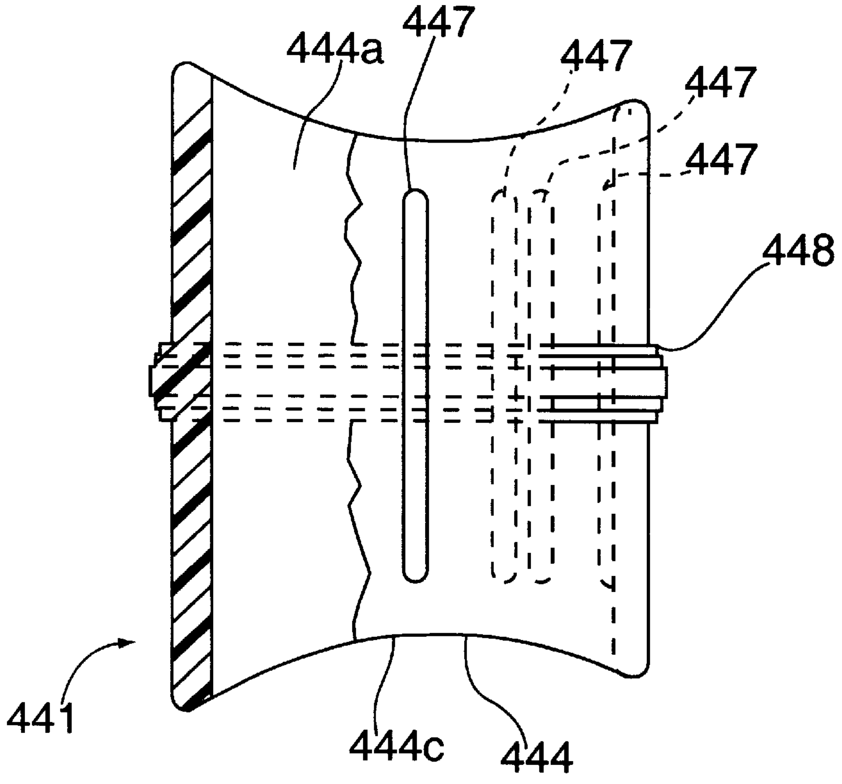
FIG. 14C is a front elevational partial cross sectional view thereof, with the hidden barrel engaging ridges shown in dotted lines.
Figure 14D:
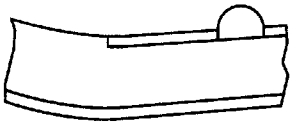
FIG. 14D is a close up top plan view of part of the barrel engaging portion of the cosmetic accessory clasp as in FIG. 14.

As shown in FIG. 14, preferably three of retention members 447 are located within smaller clip 445, wherein two are located at the respective edges of the opening of smaller clip 445, and a third is located along the sense of curvature of the interior of smaller clip 445. Furthermore, two retention member 447 are located within larger clip 444, preferably near, but not at, the opening of larger clip 444.

Additional ornamental features may be provided on cosmetic accessory clasp 441, such as serpentine shaped external spine 448, which follows the exterior convex surfaces of larger clip 444 and smaller clip 445. Serpentine spine 448 may be made of a series of parallel members, wherein the innermost member is longer than the outer members. In addition, top and bottom surfaces edges 444*b* and 444*c* of larger clip 444 may be curved, to enhance the aesthetic appearance of cosmetic accessory clasp 441.

Figure 15:
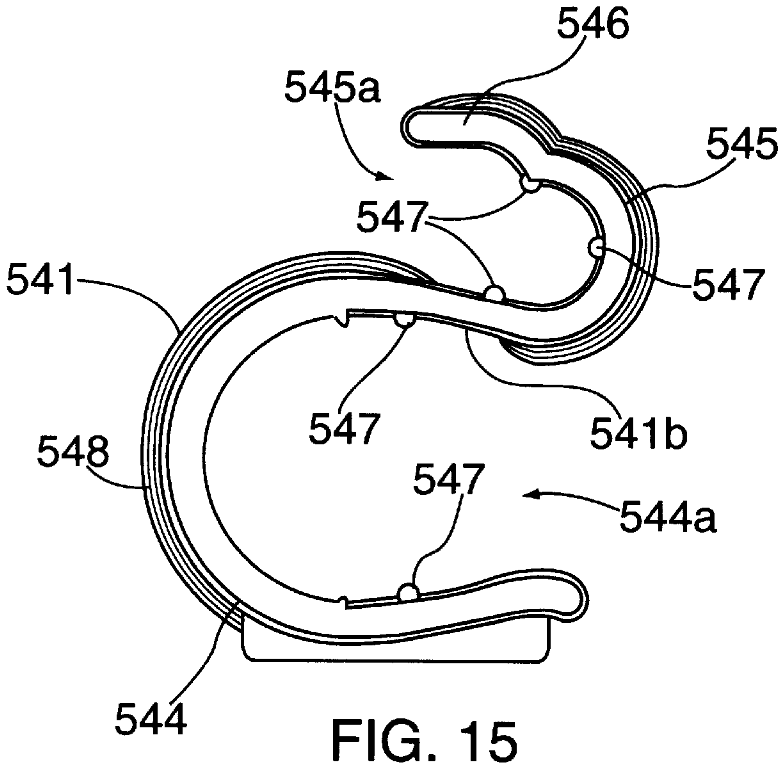
FIG. 15 is a top plan view of an eleventh S-shaped embodiment for a cosmetic accessory clasp, with a mirror attached.

Finally, in the embodiment shown in FIG. 15, clasp 541 is generally "S-shaped", wherein in this embodiment an "S" shaped embodiment includes a curved arcuate portion of a circle adjacent to an oppositely extending smaller curved arcuate portion, so that the two curved portions combined form an "S" with a larger bottom portion than the top portion.

Smaller arcuate-shaped clip 545 is interconnected to larger arcuate-shaped clip 544 in such a manner that the sense of curvature of arc-shaped clip 545 is opposite to that of its adjacent arc-shaped clip 544 wherein the interconnection is smoothly accomplished, resulting in a serpentine-shaped clasp 541.

Furthermore, smaller clip 545 is joined tangentially to larger clip 544 at a point 541*b* where the sense of curvature of arcuate smaller clip 545 changes to the opposite sense of curvature of arcuate larger clip 544.

As a result, open end 545*a* of smaller clip 545 extends in a direction 180° opposite to the direction of open end 544*a* of larger clip 544.

The inner radius of the major loop of larger clip 544 is about 0.95 cm (0.373 inches), to provide an opening of 1.89 cm (0.746 inches) to accommodate a larger lipstick barrel of about 1.8 cm (0.70 inches).

The inner radius of the minor loop of smaller clip 545 is about 0.39 cm (0.155 inches), to provide an opening of about 0.08 cm (0.031 inches) to accommodate a lip liner pencil of about 0.8 cm (0.30 inches) in diameter.

To provide stability, while depth may vary, the optimal depth of each larger clip 544, which depth corresponds to the axial orientation of a lipstick barrel placed therein, is about 3.8 cm (1.50 inches), to snugly hold a lipstick barrel therein or other axially extending cosmetic accessories therein.

To ease in guiding a lip liner pencil within smaller clip 545, an overhanging cantilevered portion 546 extends beyond the opening of smaller clip 545. While smaller clip 545 has an inner radius of about 0.39 cm (0.155 inches), the curvature of cantilevered portion 546 is less acute, and has a larger radius of about 0.45 cm (0.18 inches), to permit the lip liner pencil to guide through the opening under cantilevered portion 546 and into smaller clip 545.

To assist in retaining the lipstick barrel within larger clip 544 and the lip liner pencil within smaller clip 545, retention members 547 are provided within respective clips 544 and 545.

Figure 15A:
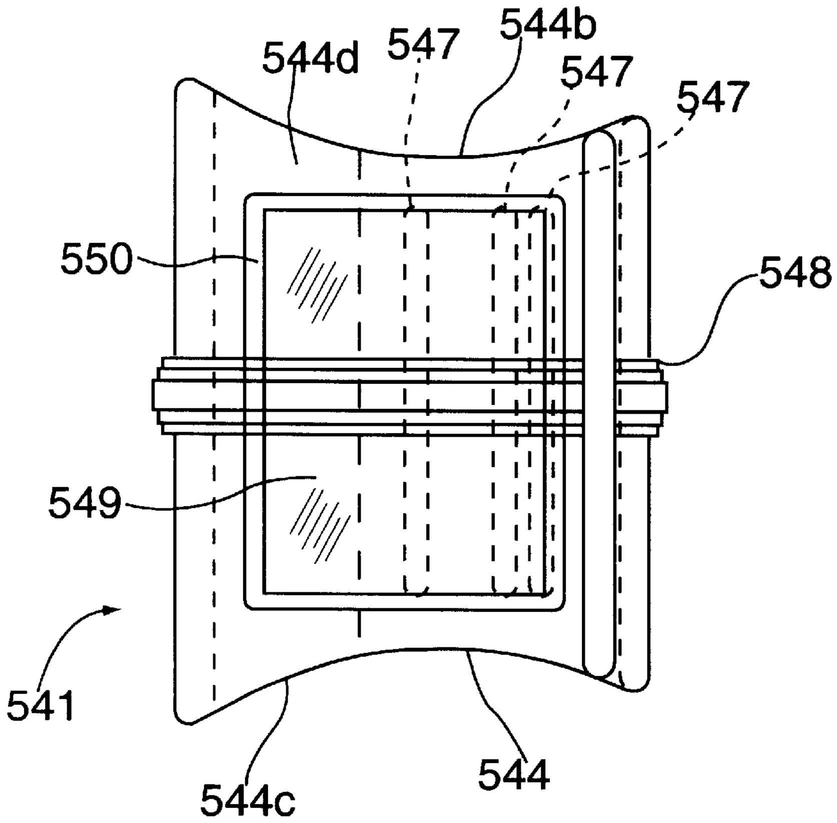
FIG. 15A is a front elevational view thereof, with the hidden barrel engaging ridges shown in dotted lines.
Figure 15B:
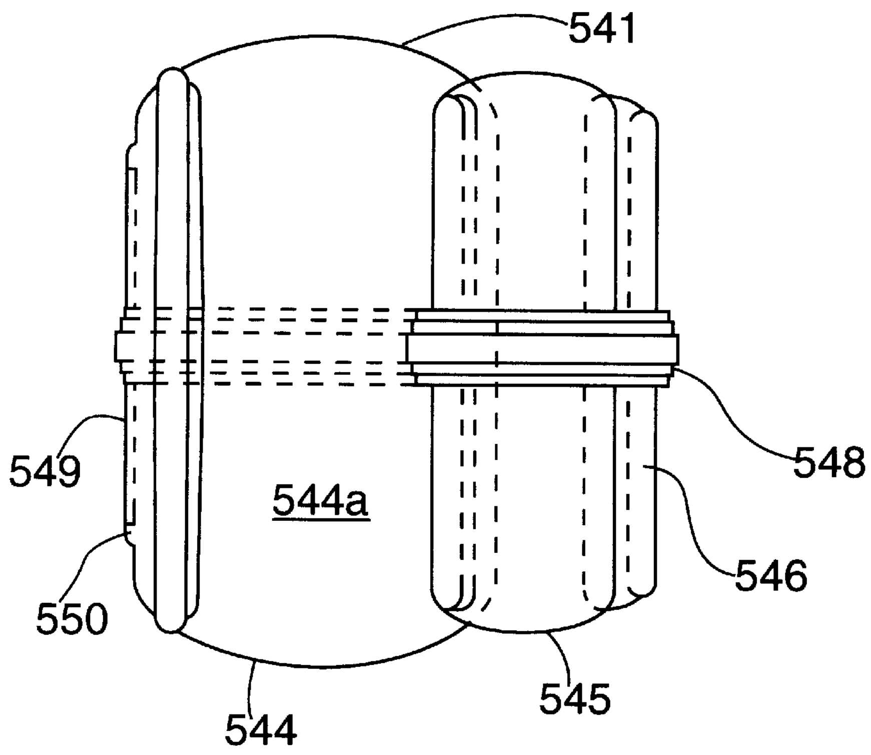
FIG. 15B is a right side elevational view thereof, with the hidden barrel engaging ridges shown in dotted lines.
Figure 15C:
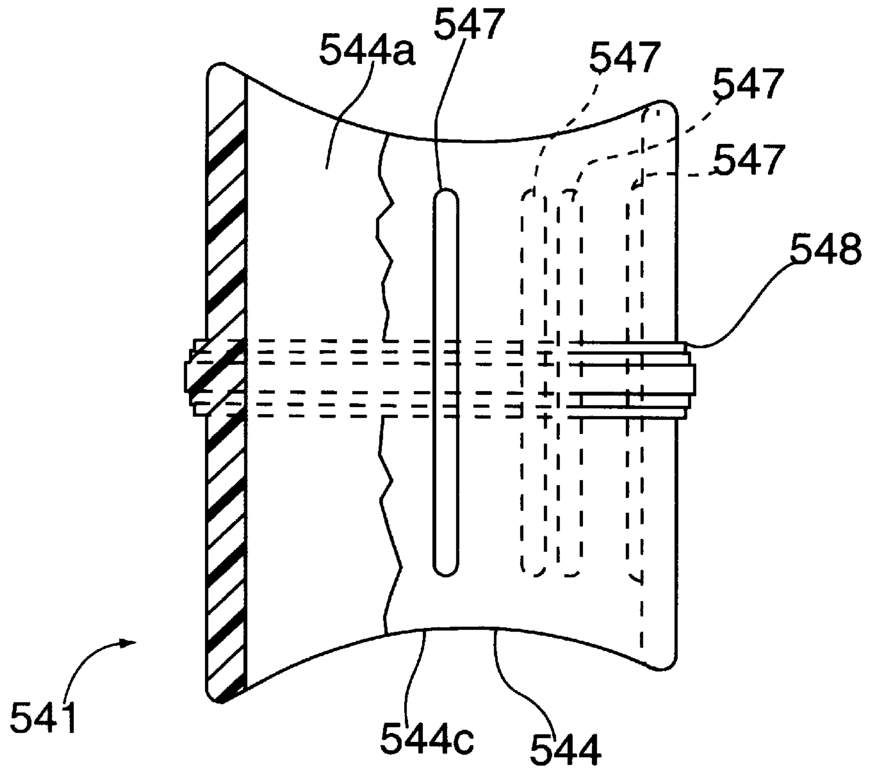
FIG. 15C is a front elevational partial cross sectional view thereof, with the hidden barrel engaging ridges shown in dotted lines; and, FIG. 15D is a front elevational view thereof, shown with the mirror in place.
Figure 15D:
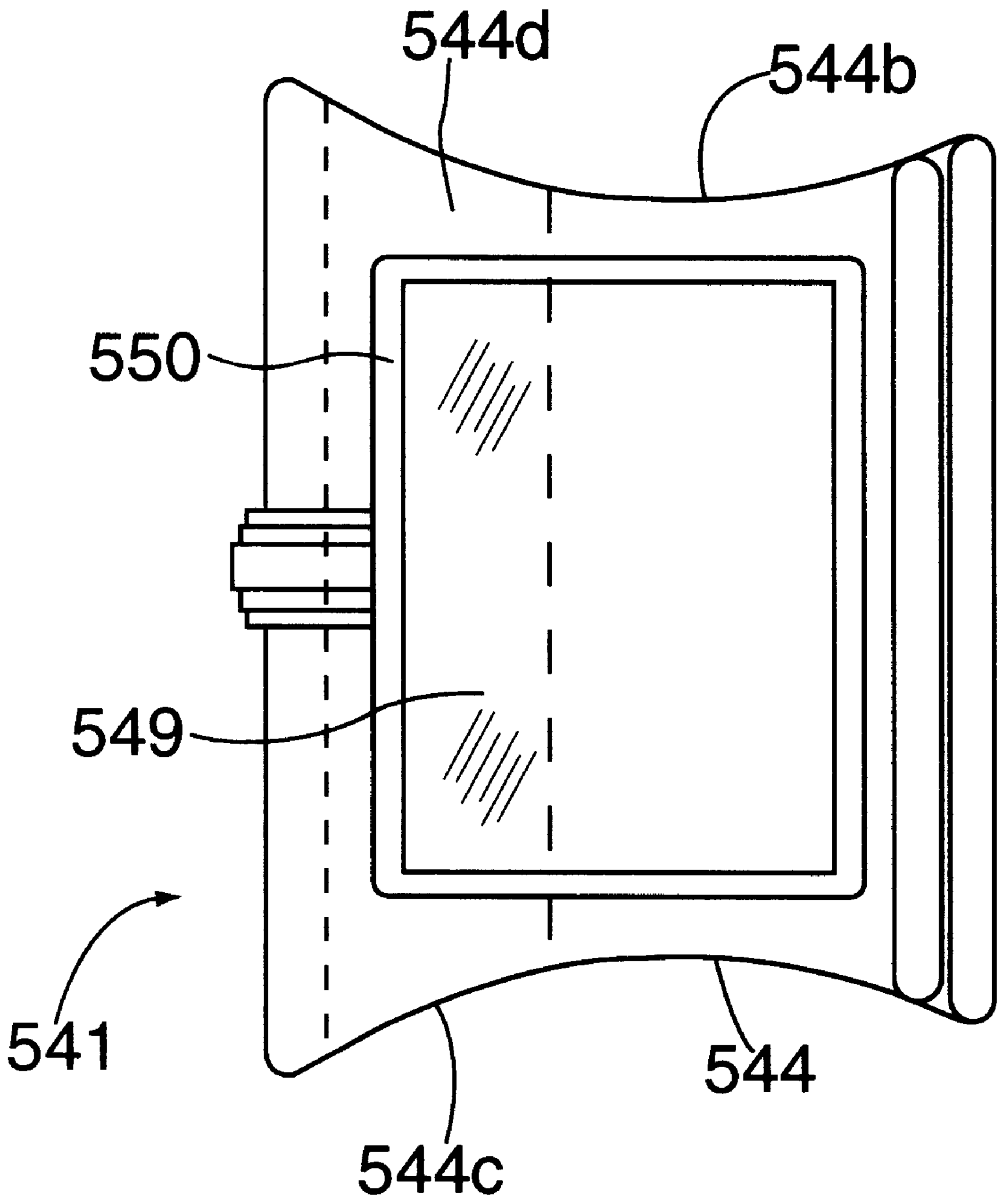

As shown in FIGS. 15A, 15B and 15C, preferably retention members are longitudinally extending ribs or ridges, which extend parallel to the axis position of the respective lipstick barrel or lip liner pencil within respective clips 544 and 545.

As shown in FIG. 15, preferably three of retention members 547 are located within smaller clip 545, wherein two are located at the respective edges of the opening of smaller clip 545, and a third is located along the sense of curvature of the interior of smaller clip 545. Furthermore, two retention member 547 are located within larger clip 544, preferably near, but not at, the opening of larger clip 544.

As a further optional feature, as shown in FIGS. 15, 15A, 15B and 15D, a mirror 549 may be inlaid in a frame 550 adjacent to outer convex arcuate exterior surface 544*d* of larger clip 544 of cosmetic accessory clasp 541.

Other non functional decorative features may be added to cosmetic accessory clasp 541, such as serpentine shaped external spine 548, which follows the exterior convex surfaces of larger clip 544 and smaller clip 545. Serpentine spine 548 may exhibit other ornamental features, such as the fact that it is made of a series of parallel members, wherein the inner most member is longer than the outer members. In addition, top and bottom surfaces edges 544*b* and 544*c* of larger clip 544 may be curved, to provide a further aesthetic look to cosmetic accessory clasp 541.

Figure 16A:
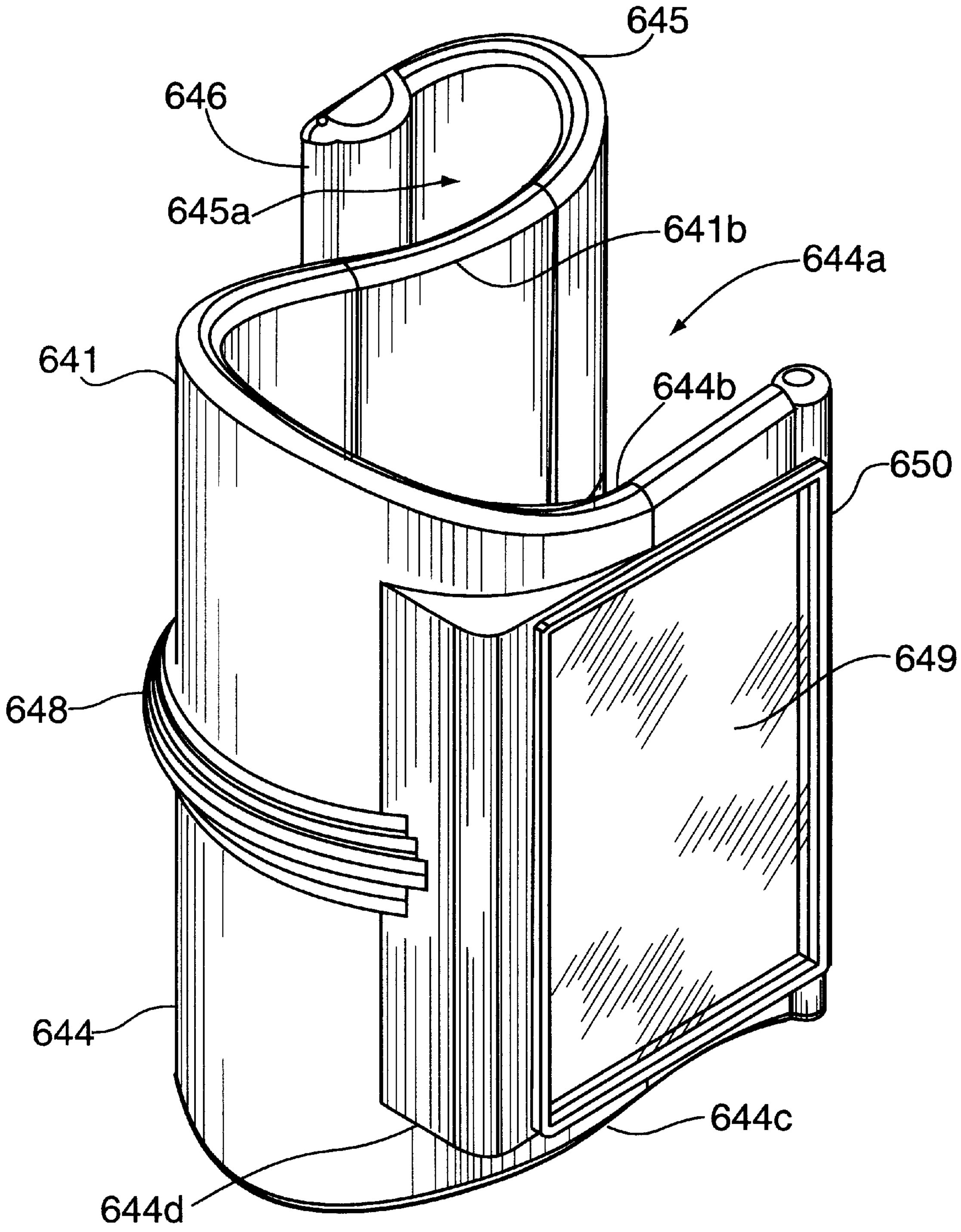
FIGS. 16A, 16B and 16C are isometric views of an S-shaped twelfth embodiment for a cosmetic accessory clasp, with a mirror attached.
Figure 16B:
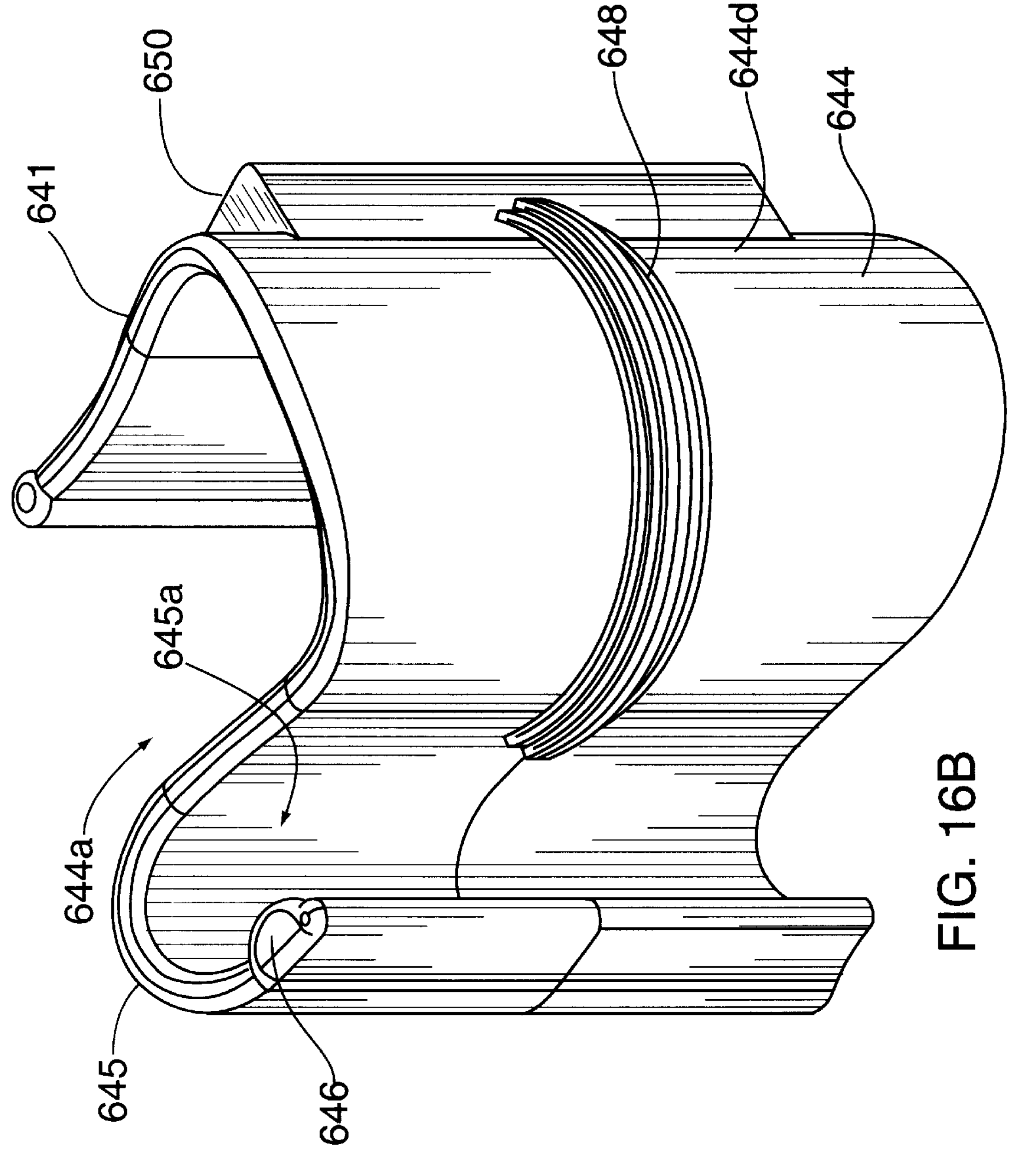
Figure 16C:
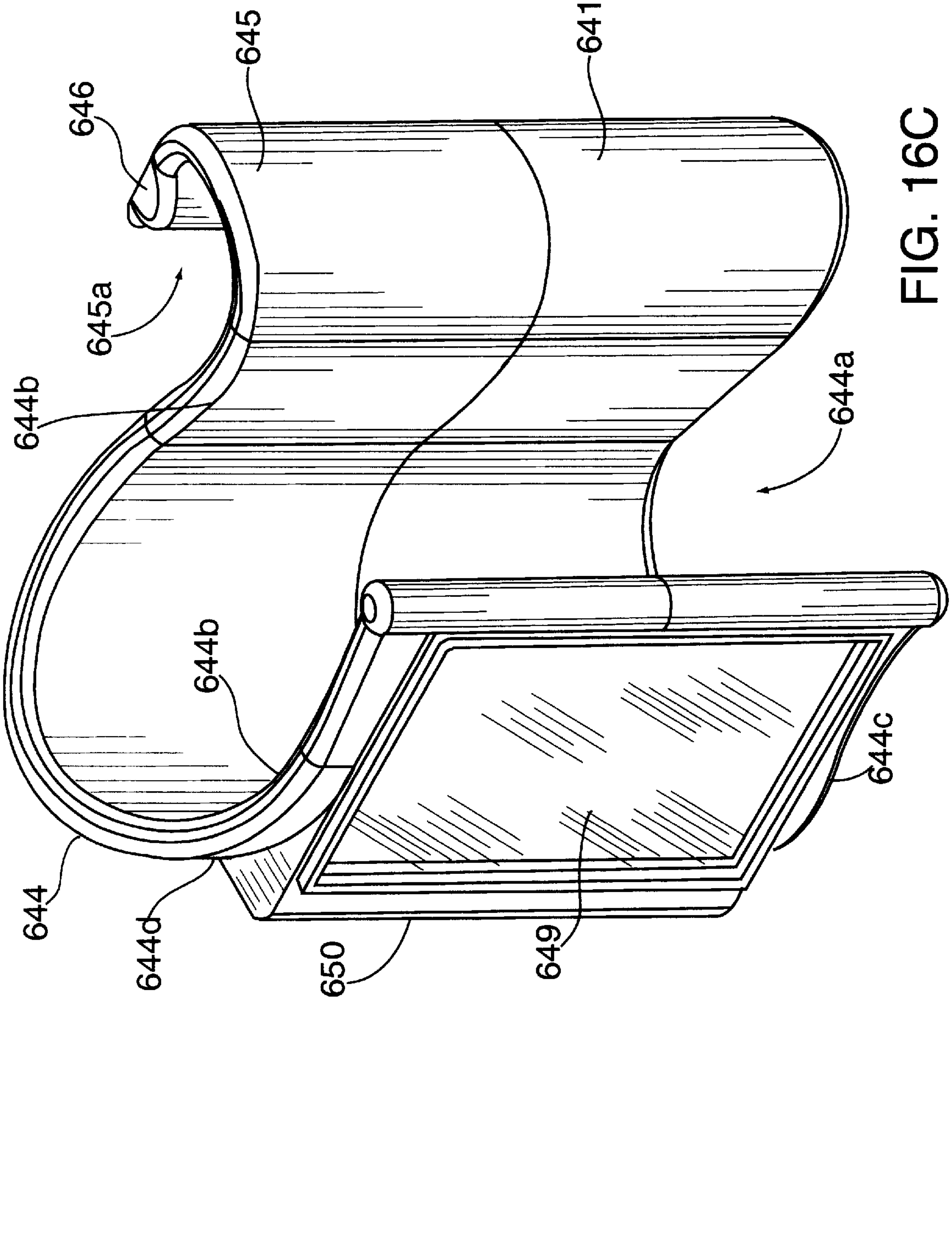

As shown in FIGS. 16A, 16B, 16C, clasp 641 is generally "S-shaped". Smaller arcuate-shaped clip 645 is interconnected to larger arcuate-shaped clip 644 in such a manner that the sense of curvature of open arc-shaped clip 645 is opposite to that of its adjacent open arc-shaped clip 644, wherein the interconnection is smoothly accomplished, resulting in a serpentine-shaped clasp 641.

Furthermore, smaller clip 645 is joined tangentially to larger clip 644 at a point 641*b* where the sense of curvature of arcuate smaller clip 645 changes to the opposite sense of curvature of arcuate larger clip 644.

As a result, open end 645*a* of smaller clip 645 extends in a direction of about 180° opposite to the direction of open end 644*a* of larger clip 644.

To ease in guiding a lip liner pencil within smaller clip 645, an overhanging cantilevered ramp portion 646 extends beyond the opening of smaller clip 645.

As a further optional feature, as shown in FIGS. 16A, 16B and 16C, a mirror 649 may be inlaid in a frame 650 adjacent to outer convex arcuate exterior surface 644*d* of larger clip 644 of cosmetic accessory clasp 641.

Figure 17B:
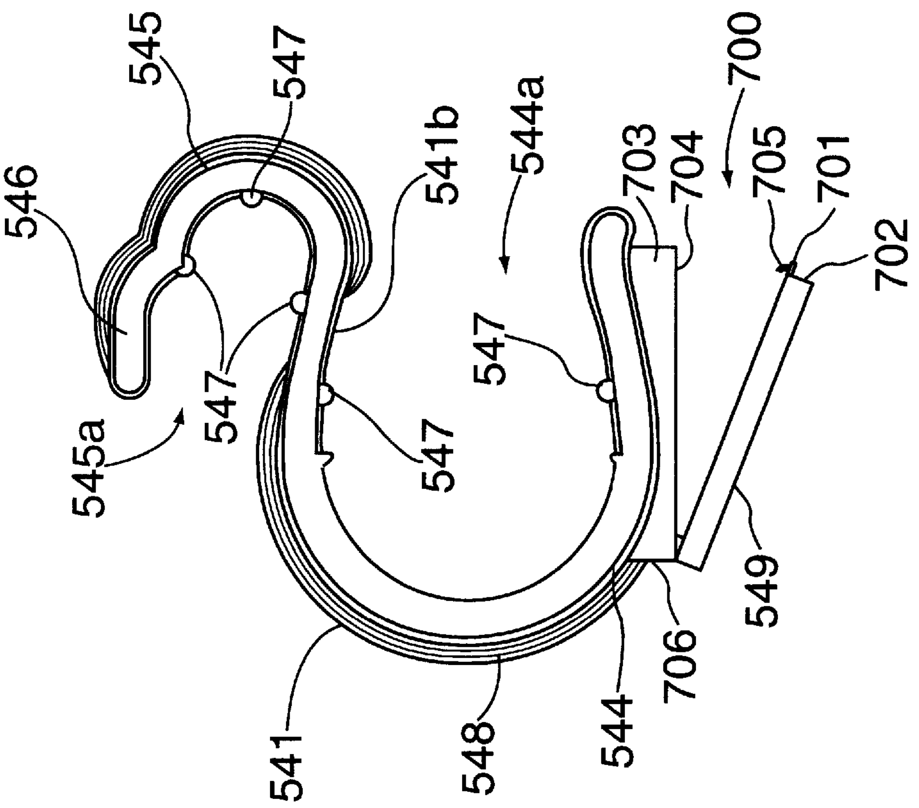
FIG. 17B is a top plan view thereof showing hinged cover in a partially open position.
Figure 17A:
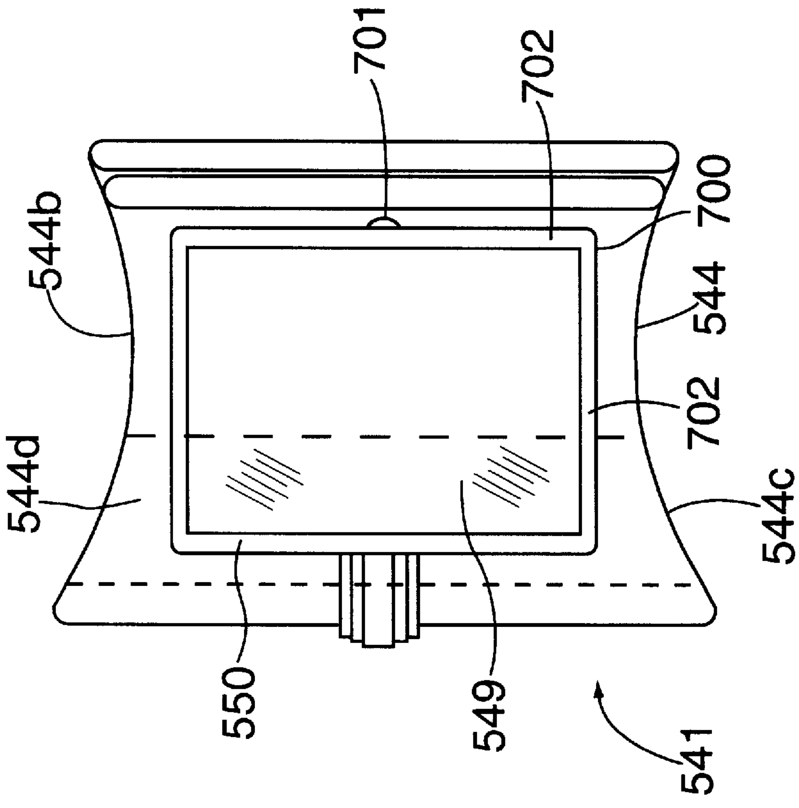
FIG. 17A is a front elevational view of a thirteenth S-shaped embodiment for a cosmetic accessory clasp, with hollow make-up compact having hinged mirrored cover attached.

FIGS. 17A and 17B show two views of a thirteenth S-shaped embodiment of this invention wherein a hollow make-up compact 700 with mirror 549 attached to hinged cover 702 is attached to the cosmetic accessory clasp. Molded latch extension 701 is used to urge latch hook 705 from depression (not shown) in compact base 703 to open the compact 700 thereby gaining access to interior 704. The hinge at edge 706 can be a molded "living hinge" if cover

702 is molded as one piece with the accessory clasp. If the cover 702 is molded separately, a snap-in type of hinge of well known construction can be used effectively.

Figure 18C:
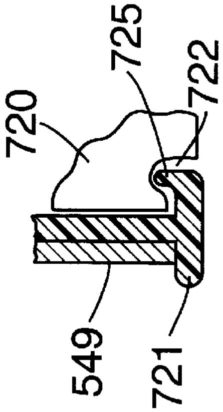
FIG. 18C is a detail thereof.
Figure 18A:
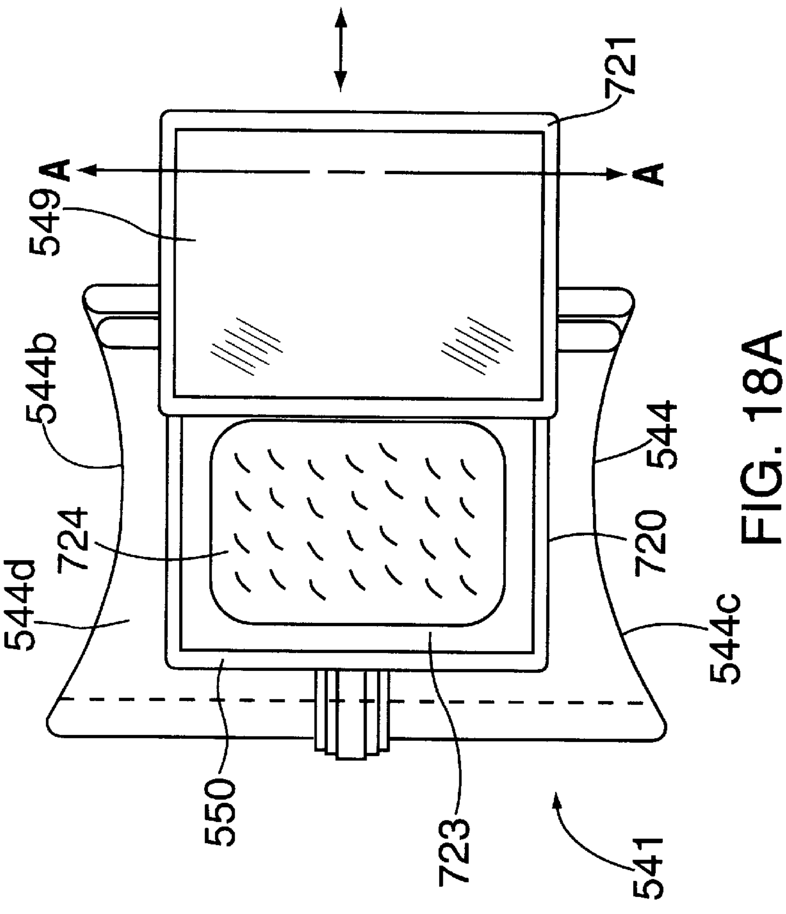
FIG. 18A is a front elevational view of a fourteenth S-shaped embodiment for a cosmetic accessory clasp, with hollow make-up compact having a sliding mirrored cover attached shown in an open position.
Figure 18B:
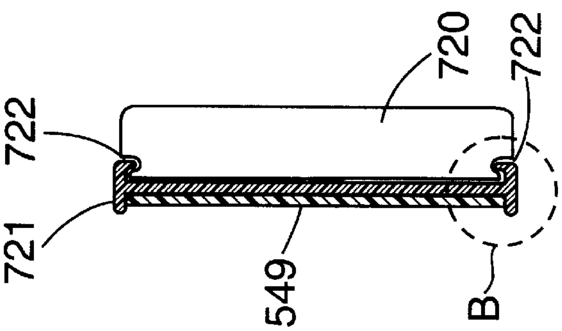
FIG. 18B is a crossectional end view showing the sliding cover engagement with the compact.

FIGS. 18A, 18B and 18C show three views of a fourteenth S-shaped embodiment of this invention wherein the mirrored cover 721 of compact base 720 has a sliding relationship. In FIG. 18A, cover 721 is shown in the fully open position revealing cake type or powder make-up 723 and an applicator pad 724. The crossection view of FIG. 18B and the enlarged detail of FIG. 18C show the sliding relationship between grooves 722 in compact base 720 and the engagement edge 725 of sliding cover 721.

Figure 19:
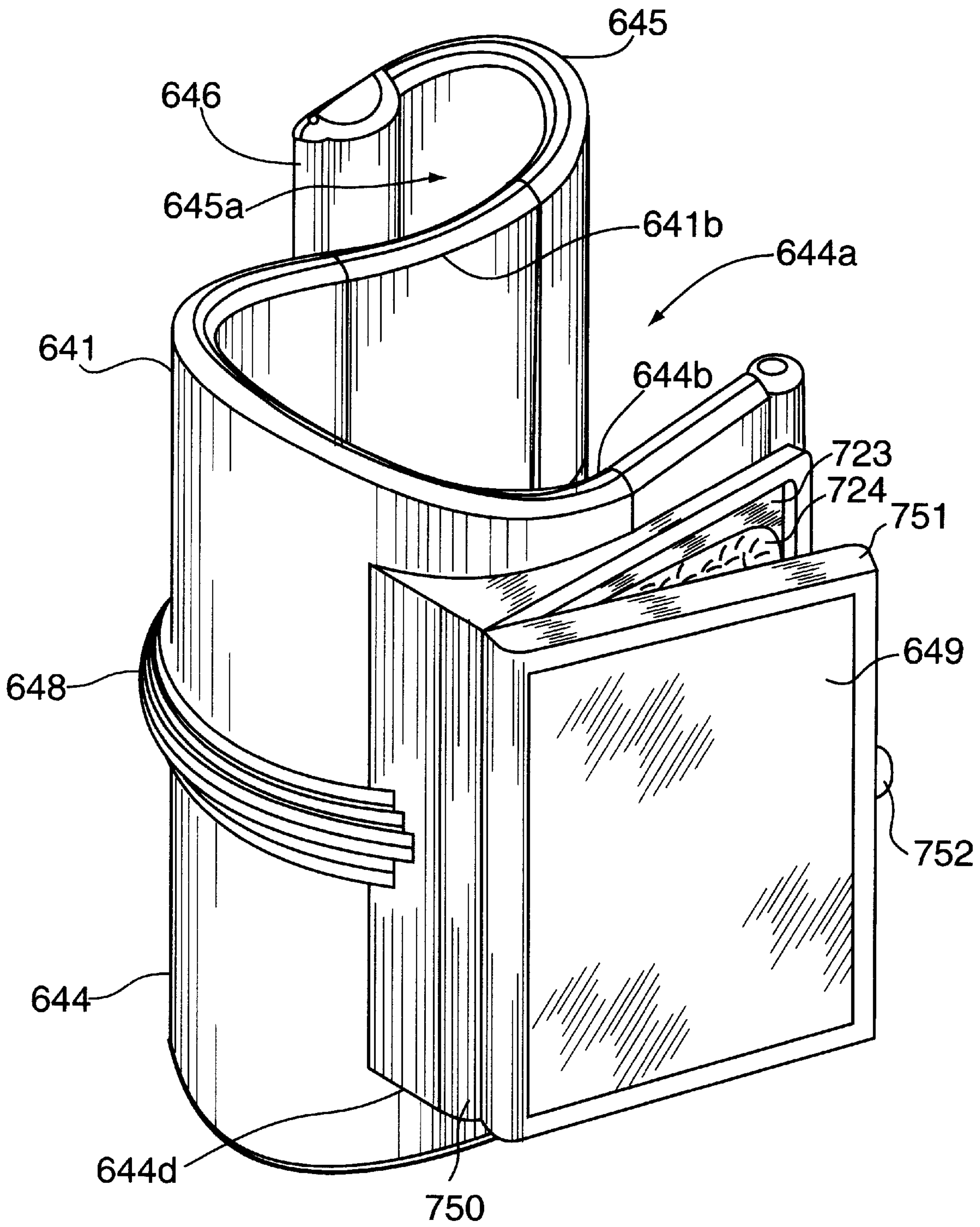
FIG. 19 is an isometric view of a fifteenth S-shaped embodiment for a cosmetic accessory clasp, with hollow make-up compact having a hinged mirrored cover shown in a partially open configuration.

FIG. 19 shows a view of a fifteenth embodiment of an S-shaped clasp of this invention with hollow make-up compact 750 attached. Compact cover 751 has an attached mirror 649 and release catch 752. An alternate embodiment can have the clasp design of FIG. 19 with a compact using a sliding cover as detailed in FIGS. 18A, 18B and 18C.

While they are not essential, other non functional decorative features may be added to cosmetic accessory clasp 641, such as serpentine shaped external spine 648, which follows a portion of the exterior convex surfaces of larger clip 644, but not along smaller clip 645. Serpentine spine 648 may exhibit other ornamental features, such as the fact that it is made of a series of parallel members, wherein the inner most member is longer than the outer members. In addition, top and bottom surfaces edges 644*b* and 644*c* of larger clip 644 may be curved, to provide a further aesthetic look to cosmetic accessory clasp 641.

While the foregoing examples show two clips forming a clasp, such as clips 444 and 445 forming clasp 441, it is contemplated that two or more clips may be made in one clasp. For example, clasp 441 may optionally have a third clip (not shown) being adjacent to one portion of clasp 441, such as adjacent to clip 444 at an outer edge opposite to point 441*b*, at which point 441*b* the sense of curvature of clip 444 changes to the sense of curvature of clip 445.

It is further noted that other modifications may be made to the present invention, without departing from the scope of the invention, as noted in the appended claims.

I claim:

1. A unitary clip and cosmetic make-up compact case for clipping together an elongate lipstick barrel and an elongate lip liner pencil, comprising;

a first channel-shaped clip member having a first concave open internal wall, in which no parts of said first internal wall are contiguous such that free edges of the channel forming said wall are spaced from one another;

said first internal wall being shaped and dimensioned to resiliently grip said barrel; and, integral with said first member, a second channel-shaped clip member which has a smaller bore than said first member and extends substantially parallel to said first member such that respective channels of said first and second members are coterminous;

said second member having a second concave open internal wall shaped and dimensioned to resiliently grip said pencil, in which no parts of said second internal wall are contiguous, such that free edges of the channel forming said wall are spaced from one another, said first and second members being separated from one another by a common elongate partition wall having a first face forming part of said first internal wall and a second face forming part of said second internal wall, said clip having a hollow cosmetic make-up compact case attached to an exterior surface of said clip.

2. The clip as in claim 1 wherein said hollow cosmetic make-up compact case has a mirrored cover.

3. The clip as in claim 1 wherein said hollow cosmetic make-up compact case has a hinged cover.

4. The clip as in claim 3 wherein said hinged cover has a latch for locking said hinged cover to a closed position.

5. The clip as in claim 1 wherein said hollow cosmetic make-up compact case has a sliding cover.

6. The clip as in claim 5 wherein said sliding cover slides within grooves in a base of said hollow cosmetic make-up compact case.

7. A cosmetic accessory clasp for axially extending cosmetic accessories, such as a lipstick barrel and lip liner pencil, said clasp comprising in combination:

an first larger arcuate-shaped open clip having attached at a closed portion thereof a smaller arcuate-shaped open clip adjacent to said larger arcuate-shaped open clip, a lipstick barrel being insertable and engagable by a spring action of said larger arcuate-shaped open clip and further, a lip liner pencil being insertable and engagable by a spring action of said smaller arcuate-shaped open clip adjacent to said larger arcuate-shaped open clip, said larger arcuate-shaped open clip comprising an arcuate portion of a circle adjacent to a oppositely extending smaller arcuate portion, wherein said larger arcuate-shaped open clip and said smaller arcuate-shaped open clip together form an "S" with a larger bottom portion than a smaller top portion, said smaller arcuate-shaped open clip being interconnected to said larger arcuate-shaped open clip in such a manner that the sense of curvature of said larger arcuate shaped open clip is opposite to that of said adjacent smaller arcuate shaped open clip, resulting in a serpentine-shaped cosmetic accessory clasp, said smaller arcuate shaped open clip being joined tangentially to said larger arcuate shaped open clip at a point where said sense of curvature of said smaller arcuate-shaped open clip changes to said opposite sense of curvature of said larger arcuate-shaped open clip, an open end of said smaller arcuate-shaped open clip extending in a direction opposite to the direction of an open end of said larger arcuate-shaped open clip, and, said clasp having a hollow cosmetic make-up compact case attached to an exterior surface of said clip.

8. The clip as in claim 7 wherein said hollow cosmetic make-up compact case has a mirrored cover.

9. The clip as in claim 7 wherein said hollow cosmetic make-up compact case has a hinged cover.

10. The clip as in claim 9 wherein said hinged cover has a latch for locking said hinged cover to a closed position.

11. The clip as in claim 7 wherein said hollow cosmetic make-up compact case has a sliding cover.

12. The clip as in claim 11 wherein said sliding cover slides within grooves in a base of said hollow cosmetic make-up compact case.

* * * * *